United States Patent [19]

Balder

[11] 3,808,690

[45] May 7, 1974

[54] TELESCOPIC MEASUREMENT TRANSFER DEVICE

[76] Inventor: Norman J. Balder, 416 N. 14th St., Terre Haute, Ind. 47807

[22] Filed: Jan. 5, 1973

[21] Appl. No.: 321,447

[52] U.S. Cl. .............. 33/1 CC, 33/161, 33/180 R, 33/197, 33/DIG. 10
[51] Int. Cl. ............................................ G01b 3/00
[58] Field of Search ........ 33/1 CC, DIG. 10, 180 R, 33/174 N, 161, 197, 174 G

[56] References Cited
UNITED STATES PATENTS

| | | | |
|---|---|---|---|
| 2,431,100 | 11/1947 | Woods | 33/174 N |
| 2,563,599 | 8/1951 | Gardner | 33/174 N |
| 2,605,921 | 8/1952 | Johnson | 33/180 R X |
| 2,830,374 | 4/1958 | Aivaz | 33/174 G |
| 3,522,658 | 8/1970 | Howell | 33/161 |
| 3,672,064 | 6/1972 | Elkins | 33/197 |

Primary Examiner—William D. Martin, Jr.
Attorney, Agent, or Firm—Woodard, Weikart, Emhardt & Naughton

[57] ABSTRACT

A telescopic device for locating a first area on one side of a wall and then a second area on the opposite side of the wall immediately adjacent and opposite the first area. A telescopic rod has a top end with a rectangular frame pivotally mounted about the longitudinal axis of the rod. The bottom end of the rod has a V-shaped frame pivotally mounted thereto. Means are provided to control the pivotal movement of the rectangular frame about a mounting axis perpendicular to the longitudinal axis of the rod. The V-shaped frame includes a pair of arms pivotally mounted together about a mounting axis with stop means provided to limit the maximum included angle between the arms to ninety degrees.

6 Claims, 4 Drawing Figures

PATENTED MAY 7 1974   3,808,690
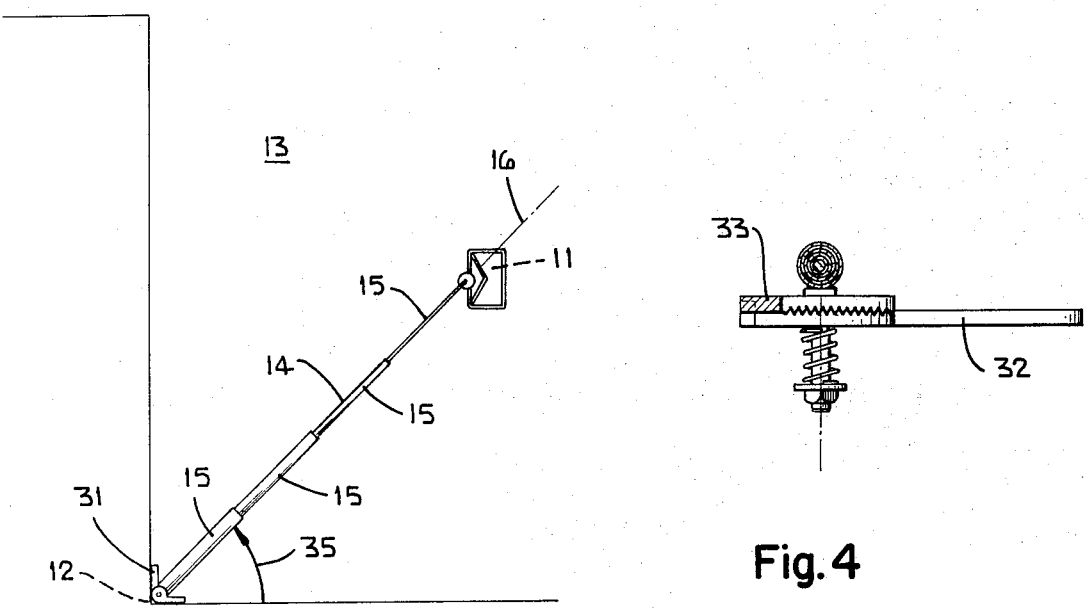
Fig. 1
Fig. 4
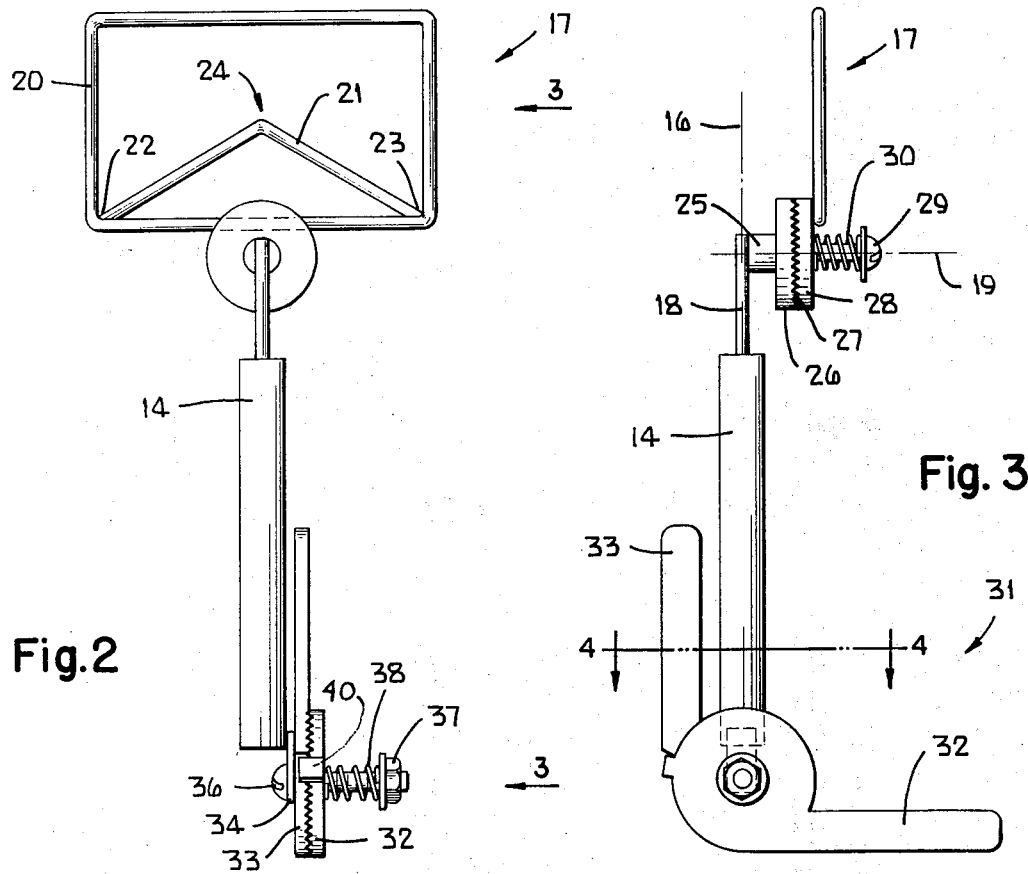
Fig. 2
Fig. 3

, 808,690

TELESCOPIC MEASUREMENT TRANSFER DEVICE

BACKGROUND OF THE INVENTION

1. Field of the Invention

This invention is in the field of measuring and locating devices.

2. Description of the Prior Art

During the construction of walls for buildings, it is necessary to provide apertures through the walls for the mounting of various electrical and plumbing fixtures. Many walls include double panels and as a result, aligned apertures in both panels of a wall may be required. It is customary to locate such an aperture be measuring vertically upward from the floor and horizontally outward from the end of the wall. The location of the aperture must then be transferred to the opposite side of the wall and the vertical and horizontal measurements are then repeated. This method introduces errors in the alignment of the apertures and requires considerable time. Disclosed herein is a device which allows for the quick and easy measurement of the location of the apertures on both sides of the wall.

SUMMARY OF THE INVENTION

One embodiment of the present invention is a telescopic device for locating a first area from a starting point on one side of a wall and then locating a second area on an opposite side of the wall immediately adjacent and opposite of members telescopically connected together, the main body having a longitudinal axis, a top end member and a bottom end member, a rectangular frame for outlining an area on the wall, the frame being pivotally mounted to the top end member and being pivotable about the longitudinal axis, first means mounted to the top end member and the rectangular frame and being disposed therebetween, the first means including a first mounting axis extending perpendicularly from the longitudinal axis, the first means being operable to control pivotal movement of the rectangular frame about the mounting axis, a first arm and a second arm pivotally mounted together to the bottom end member for positioning the bottom end member at the starting point, and second means connected to the bottom end member and mounted to the first arm and the second arm, the second means including a second mounting axis and being operable to control pivotal movement of the first arm and the second arm about the second mounting axis.

It is an object of the present invention to provide a new and improved measuring and locating device.

A further object of the present invention is to provide a device for locating a first area on one side of a wall and then locating a second area on an opposite side of the wall immediately adjacent and opposite the first area.

Related objects and advantages of the present invention will be apparent from the following description.

BRIEF DESCRIPTION OF THE DRAWINGS

FIG. 1 is a view of the device incorporating the present invention shown positioned adjacent a wall.

FIG. 2 is an enlarged view of the device of FIG. 1 shown in a partially retracted position.

FIG. 3 is a side view looking in the direction of arrows 3—3 of FIG. 2.

FIG. 4 is a cross sectional view taken along the line 4—4 of FIG. 3 and viewed in the direction of the arrows.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a telescopic device for locating a first area 11 from starting point 12 on wall 13. The device is then used to locate a second area on the opposite side of wall 13 immediately adjacent and opposite area 11.

The telescopic device includes a main body 14 which includes a plurality of members 15 telescopically connected together. Members 15 are cylindrical with the main body resembling an automobile radio antenna. Main body 14 has a longitudinal axis 16 along with a top end and a bottom end. A rectangular frame 17 for outlining area 11 is pivotally mounted to the top end of the uppermost member 15. The frame is pivotable about axis 16. In addition, members 15 are rotatable about axis 16.

Rectangular frame 17 includes a continuous rod 20 which extends peripherally therearound forming the rectangular configured frame. A V-shaped rod 21 has opposite ends 22 and 23 integrally joined to rod 20 at the two bottom corners of frame 17. Rod 21 has a vertex 24 centrally positioned in rectangular frame 17. Thus, in the event that the area be located by frame 17 is a small aperture, then the aperture may be located at vertex 24. On the other hand, if the area to be located is a large area such as an electrical power outlet box hole, then the entire frame 17 may be utilized to locate the area. Frame 17 is approximately 3 inches wide and two inches tall which is the approximate size of an electrical power outlet box hole. Means are provided to control the pivotal movement of frame 17 about mounting axis 19 which extends perpendicularly from longitudinal axis 16. The means includes a boss 25 fixedly mounted to the top end of the uppermost member 18 (FIG. 3). A first disc 26 is fixedly secured to boss 25 and has a serrated surface 27 which faces a corresponding serrated surface of a second disc 28. A threaded member 29 extends through a helical spring 30, and through discs 26 and 27. Spring 30 urges the mutually facing serrated surfaces of the disc together to maintain the position of frame 17 about axis 19. By applying pressure to frame 17, relative motion between discs 26 and 28 is allowed so as to provide for the pivotal motion of frame 17 with respect to axis 19. Thus, depending upon the angle 35 (FIG. 1) between the main body and the floor, frame 17 may always be pivoted to the appropriate orientation for outlining area 11.

A V-shaped frame 31 is pivotally mounted to the bottom end of the lowermost member of main body 14. Frame 31 includes a first arm 32 and a second arm 33

(FIG. 3) which are pivotally mounted together to flange 34 fixedly secured to the main body 14. A threaded member 36 extends through flange 34 and arms 33 and 32 being received by fastener 37. The helical spring 38 is positioned between fastener 37 and arm 32 urging the mutually facing serrated surfaces of arms 32 and 33 together.

Arms 32 and 33 are positioned at the starting location such as the intersection of the wall edge and the floor as shown in FIG. 1. Arm 32 includes a tab 40 which projects outwardly against arm 33 to limit the maximum included angle between the arms to 90°. Arms 32 and 33 are pivotally movable about an axis which is perpendicular to longitudinal axis 16 and which extends centrally through spring 38.

To use the device shown in FIG. 1, the V-shaped frame 31 is located at a convenient starting position such as the intersection of the wall edge and the floor. The main body is then telescoped to position frame 17 adjacent to the desired area 11 with frame 17 being pivoted so as to be aligned with area 11. The area is then marked with a suitable marking device such as a pencil. The telescopic device is then removed from the wall and positioned on the opposite side of the wall with the user being careful to not distrub the relative position of frames 17 and 31 with respect to the telescopic main body. The second area opposite area 11 may then be marked.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A telescopic device for locating a first area from a starting point on one side of a wall and then locating a second area on an opposite side of said wall immediately adjacent and opposite said first area comprising:

a main body with a plurality of members telescopically connected together, said main body having a longitudinal axis, a top end member and a bottom end member;

a rectangular frame for outlining an area on said wall, said frame being pivotally mounted to said top end member and being pivotable about said longitudinal axis;

first means mounted to said top end member and said rectangular frame and being disposed therebetween, said first means including a first mounting axis extending perpendicularly from said longitudinal axis, said first means being operable to control pivotal movement of said rectangular frame about said mounting axis;

a first arm and a second arm pivotally mounted together to said bottom end member for positioning said bottom end member at said starting point; and, second means connected to said bottom end member and mounted to said first arm and said second arm, said second means including a second mounting axis and being operable to control pivotal movement of said first arm and said second arm about said second mounting axis.

2. The telescopic device of claim 1 wherein:

said first arm includes stop means abuttable against said second arm to limit a maximum included angle between said first arm and said second arm to ninety degrees.

3. The telescopic device of claim 2 wherein said rectangular frame includes a continuous rod extending peripherally therearound and a V-shaped rod with opposite ends integrally joined to said continuous rod at two corners of said rectangular frame, said V-shaped rod having a vertex centrally positioned in said rectangular frame.

4. The telescopic device of claim 3 wherein:

said first means includes a boss fixedly mounted to an end of said top end member which is a rod, said first means further includes a first disc fixedly mounted to said boss, a second disc, a helical spring and a threaded member extending through said spring, said second member and into said first member with said rectangular frame fixedly mounted to said second disc, said first disc and said second disc have mutually facing serrated surfaces urged together by said spring.

5. The telescopic device of claim 4 wherein:

said first arm and said second arm have mutually facing serrated surfaces; and, said second means includes a second helical spring and a threaded member mounted to said bottom end member and extending through said first arm, said second arm and said second spring which urges said serrated surfaces of said first arm and said second arm together.

6. The telescopic device of claim 5 wherein:

said main body is cylindrical and said members are rods.

* * * * *

UNITED STATES PATENT OFFICE
CERTIFICATE OF CORRECTION

Patent No. 3,808,690   Dated May 7, 1974

Inventor(s) Norman J. Balder

It is certified that error appears in the above-identified patent and that said Letters Patent are hereby corrected as shown below:

In column 1, line 15, the word "be" should be changed to read --by--.

In column 1, line 31, after "opposite" and before "of", the following should be inserted: --the first area comprising a main body with a plurality--.

In column 2, line 39, insert the word --to-- after "area" and before "be".

Signed and sealed this 10th day of September 1974.

(SEAL)
Attest:

McCOY M. GIBSON, JR.       C. MARSHALL DANN
Attesting Officer      Commissioner of Patents